United States Patent [19]

Wang et al.

[11] Patent Number: 4,619,040

[45] Date of Patent: * Oct. 28, 1986

[54] METHOD OF FABRICATING STATOR FOR A MULTIPLE POLE DYNAMOELECTRIC MACHINE

[75] Inventors: David C. Wang, Allen County, Ind.; Harry W. Voepel, Lincoln County, Mo.

[73] Assignee: Emerson Electric Co., St. Louis, Mo.

[*] Notice: The portion of the term of this patent subsequent to Jan. 24, 2001 has been disclaimed.

[21] Appl. No.: 713,021

[22] Filed: Mar. 18, 1985

Related U.S. Application Data

[60] Continuation of Ser. No. 497,085, May 23, 1983, Pat. No. 4,520,287, which is a division of Ser. No. 315,228, Oct. 27, 1981, Pat. No. 4,426,771.

[51] Int. Cl.[4] .................................. H02K 15/06
[52] U.S. Cl. ................................. 29/596; 310/184
[58] Field of Search ................. 29/596, 598, 736; 310/184, 180, 198, 202, 208

[56] References Cited

U.S. PATENT DOCUMENTS

| | | | |
|---|---|---|---|
| 1,326,502 | 12/1919 | Hentzell | 310/180 |
| 3,531,672 | 9/1970 | King | 310/180 |
| 3,949,464 | 4/1976 | Walker | 29/596 |
| 4,220,881 | 9/1980 | Hamilton et al. | 310/184 |
| 4,227,106 | 10/1980 | Druss et al. | 310/184 |
| 4,357,968 | 11/1982 | Kieffer | 29/736 X |

FOREIGN PATENT DOCUMENTS 200345  10/1906  Fed. Rep. of Germany ...... 310/179

OTHER PUBLICATIONS

Exhibit 1—General Electric Drawing 24C 30058.
Exhibit 2—General Electric Production Instructions.

Primary Examiner—Carl E. Hall
Attorney, Agent, or Firm—Polster, Polster and Lucchesi

[57] ABSTRACT

A stator assembly for a multiple-pole (e.g., an 18 pole) induction motor is disclosed having a main winding and an auxiliary winding with the main and auxiliary windings each having a first and a second coil set, each of these coil sets having multiple coils selectively electrically connected together. The stator assembly further includes a core having slots therein for receiving the coils. There is one coil of the first auxiliary winding coil set inserted in the first and third slots of the core, one coil of the first main winding coil set inserted in the second and fourth slots, one coil of the second auxiliary winding coil set inserted in the third and fifth slots, and one coil of the second main winding coil set inserted in the fourth and sixth slots thereby to form a layered coil insertion pattern of the coils in the first six slots of the core. Second coils from each of the coil sets are then inserted in a similar layered fashion in the slots 5–10 of the core to form another layered insertion pattern of the coils in the slots. This layered insertion pattern is repeated until all of the coils are inserted into the slots of the core.

A method of fabricating such a stator assembly for a multiple pole motor is also disclosed.

7 Claims, 16 Drawing Figures

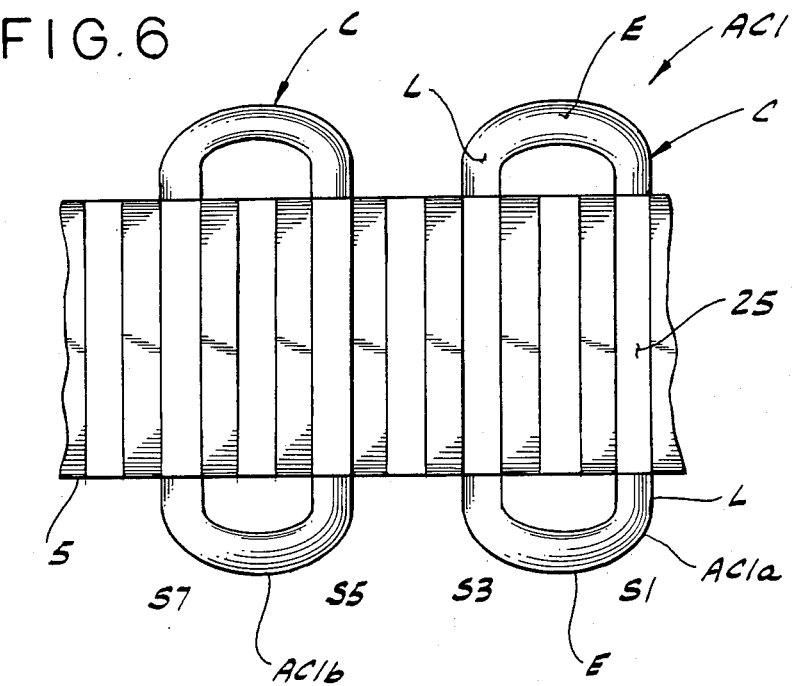
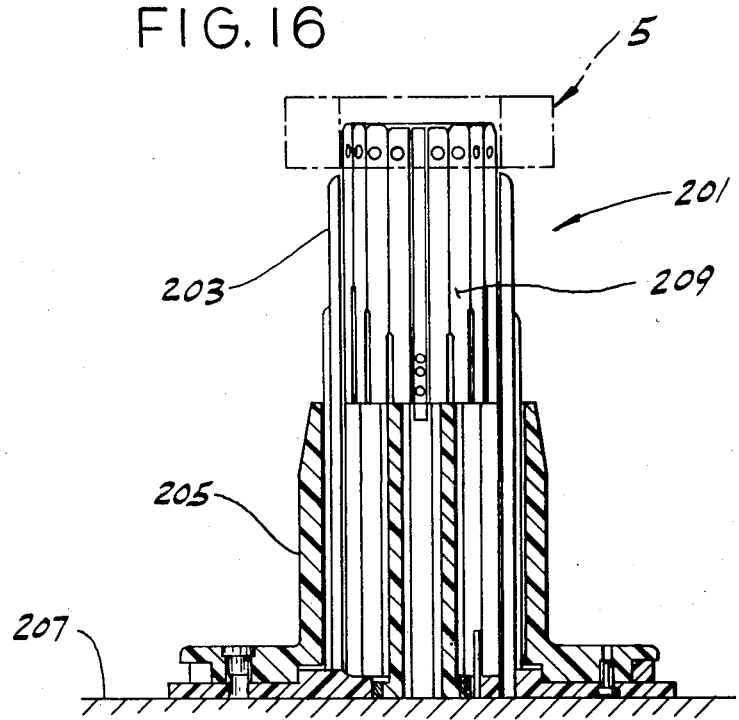

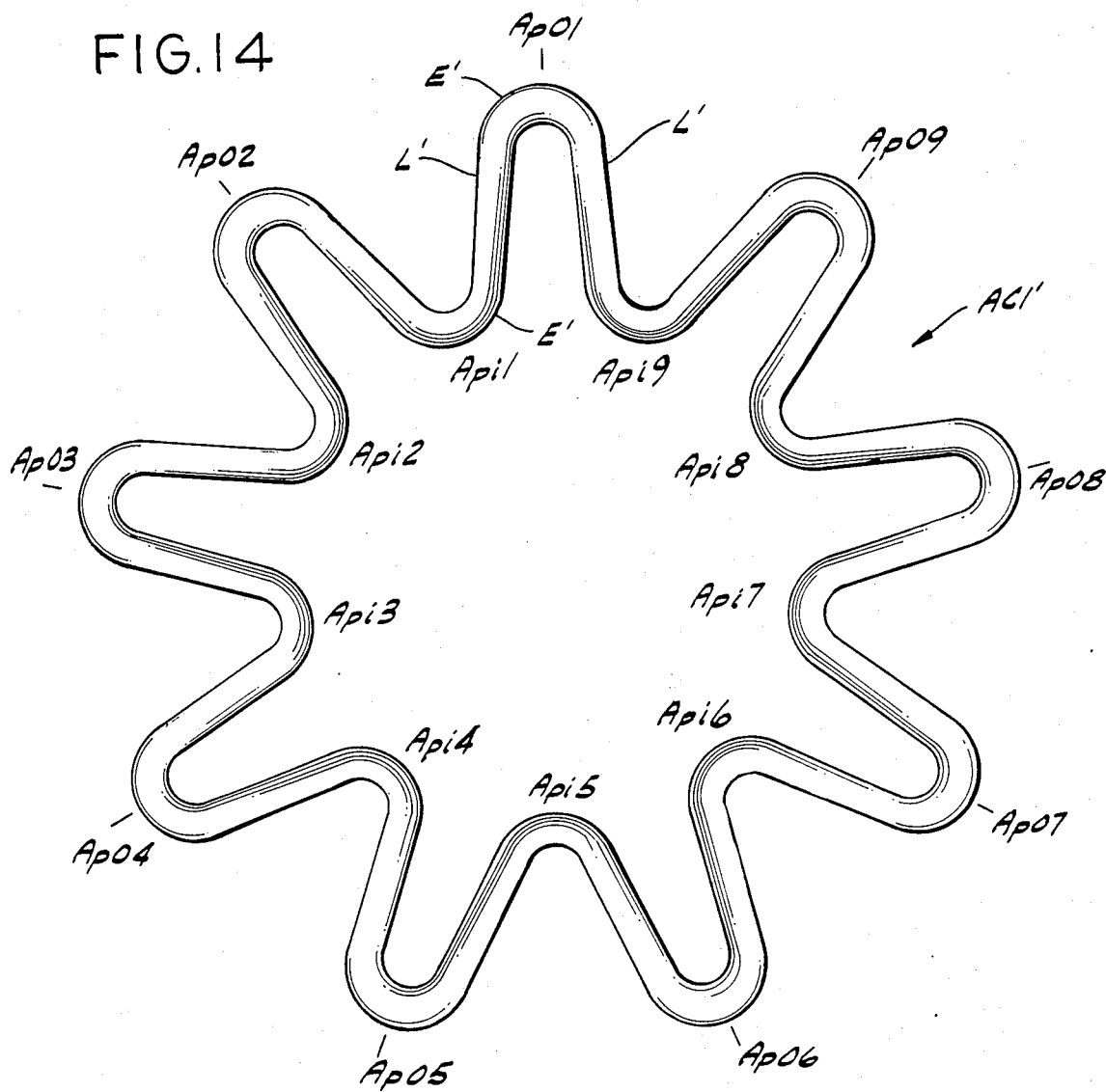
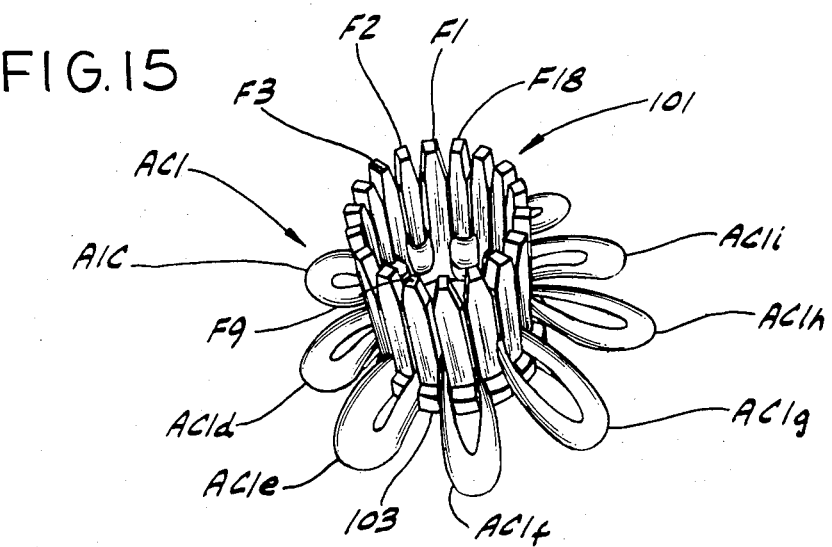

METHOD OF FABRICATING STATOR FOR A MULTIPLE POLE DYNAMOELECTRIC MACHINE

This is a continuation of co-pending application Ser. No. 497,085, filed May 23, 1983 now U.S. Pat. No. 4,520,287, which is a division of U.S. patent application Ser. No. 315,228, filed Oct. 27, 1981, now U.S. Pat. No. 4,426,771, issued Jan. 24, 1984.

BACKGROUND OF THE INVENTION

This invention relates to a method of fabricating a stator assembly for a multiple-pole dynamoelectric machine (e.g., an induction motor) and to a stator assembly made in accordance with the method of this invention.

In certain electric motor applications, such as in ceiling fans, the motor is designed to run at a relatively low or slow speed. For example, a ceiling fan motor may be operated at 350 R.P.M. These motors may have 18 poles, as compared to more conventional 2, 4, 6, or 8 pole motors.

Conventionally, the windings for these multiple-pole motors comprise concentrically wound coil sets each having a plurality of separate, individual coils electrically interconnected with one another, one coil for each pole of the motor. Thus, for an 18 pole motor, there would be required 18 separate coils of magnet wire for the main winding of the motor and 18 separate coils of magnet wire for the auxiliary winding of the motor. Each of these individual coils typically had a large number of turns of magnet wire therein. For example, each main winding coil of an 18 pole ceiling fan motor may have 185 turns or more of No. 27 - No. 30 wire. Because of the large number of turns and the large number of poles in the motor, these 18 pole ceiling fan motors are difficult and expensive to manufacture. Additionally, conventional coil winding and inserting techniques utilized to manufacture these prior ceiling fan motors were labor intensive and were thus expensive.

Typically, prior art concentrically wound coil set motors, such as illustrated in FIG. 4 of the drawings in the instant specification, have a plurality of coils (e.g., 18) of magnet wire electrically connected to one another and inserted in the slots of the core of the stator assembly so as to form, for example, the main and auxiliary windings of the motor. Because of the high number of turns of wire in each of the coils, the end turns of the coils (i.e., the portions projecting out beyond the end faces of the stator core) are, of necessity, bulky and cannot readily be formed into a tight radius. During operation of the motor, current must flow through the end turns of the windings, but the end turns do not serve to generate any substantial portion of the rotating magnetic field of the motor. Since the resistance losses of the motor are dependent primarily upon the length of the magnet wire contained in the windings, it is desirable to make the end turns of the windings as small as possible. Additionally, a considerable amount of copper magnet wire is consumed by the end turns which makes these prior art motors costly.

Still further, because of the large end turns normally associated with such prior art concentrically wound coil, multiple pole motors, it was necessary to lace or tie the end turns of the auxiliary and main windings of the motor together with textile lacing material or the like thereby to hold the windings in place. This requirement of lacing the end turns was, of course, costly as it did require a substantial amount of labor and materials.

In an effort to reduce the size of the end turns, and yet to maintain the same operating characteristics of the motor, a prior art concentrically wound coil motor was developed in which the number of coils of the motor was doubled, but in which the number of turns per coil was halved. Further, the coils in this motor, as shown in FIG. 5, were split so that each pole for the main and auxiliary winding was constituted by a coil with the legs of adjacent coils sharing a common slot. While this did somewhat reduce the size of the end turns and did result in wire savings, it became a problem to wind such a large number of coils, to transfer the coils from, the winding apparatus to the inserting apparatus, and to insert them into the slots of the core. This fabrication process required a considerable amount of labor, was time consuming, and was therefore expensive.

Still further, it is known to skein wind the windings of an electric motor. In a skein wound motor, the windings are formed by first winding a large coil or skein of magnet wire in the shape of a circle. Then, the skein is formed to be a petalled, serpentine shape having a plurality of inner and outer apices (e.g., 9 inner apices and 9 outer apices) with straight coil sections or legs extending between the apices. Such skein wound motor windings may be made on the apparatus and in accordance with the method disclosed in the co-assigned U.S. Pat. No. 4,357,968. However, because these prior art skein windings were relatively thick and had a multiplicity of turns of magnet wire therein, they also had relatively large end turns.

SUMMARY OF THE INVENTION

Among the several objects and features of this invention may be noted the provision of a stator for a multiple-pole dynamoelectric machine and the method of fabricating such a stator, whether the windings of the stator are concentric wound or skein wound coils, in which the coils are inserted into the slots of the stator core so that the end turns of the coils are reduced in size thereby resulting in substantial savings and fabrication cost, in substantial decreases in labor cost, and in substantial increases in running efficiency for the motor;

The provision of such a stator and method which results in a winding insertion scheme allowing the windings to be more easily inserted in the core thereby to facilitate the manufacture of stators which could not heretofore readily be manufactured;

The provision of such a stator and method which reduces the amount of end turn overlap thereby permitting a decrease in the length of the end turns;

The provision of such a stator and method which results in the coils of the windings being arranged in layered groups after insertion of the windings in the core;

The provision of such a stator and a method which has a shorter end wire (or end turn) length;

The provision of such a stator and method which has sufficient room to readily accommodate a thermal protector switch or lead connections within the windings of the motor;

The provision of such a method and stator which eliminates the requirement of lacing the end turns of the windings of the motor; and The provision of such a method and stator which may be used for single or polyphase, full pitch motors.

BRIEF DESCRIPTION OF THE DRAWINGS

FIG. 6 (sheet 5) is a view taken along line 6—6 of FIG. 2 illustrating, in a flat pattern layout, the arrangement of one coil set (e.g., a first auxiliary winding coil set) with the straight coil sections or legs of this coil set inserted in a first group of core slots;

FIG. 14 is a plan view of skein wound coil set for forming either the main or auxiliary winding of the motor shown in FIG. 3 of the present invention prior to the coil set being inserted in the core slots;

FIG. 15 is a perspective view of a coil transfer tool holding a concentric wound coil set for the embodiment of this invention shown in FIG. 2; and FIG. 16 (sheet 2) is a side elevation view, shown partly in cross section, of an axial coil insertion apparatus, such as shown in U.S. Pat. No. 3,748,714, used in accordance with this invention to insert the coil sets in the core, the core being shown in phantom.

Corresponding reference characters indicate corresponding parts throughout the several views of the drawings.

DESCRIPTION OF PREFERRED EMBODIMENTS

Figure 1:
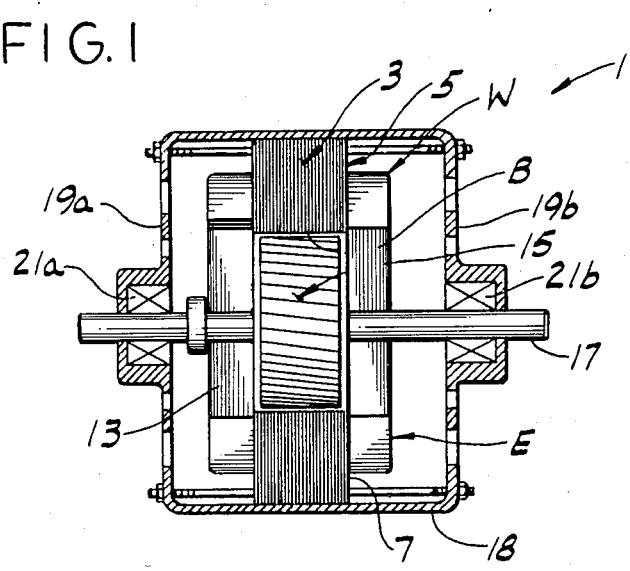
FIG. 1 is a longitudinal cross-sectional view of a typical dynamoelectric machine incorporating a stator assembly of the present invention.
Figure 2:
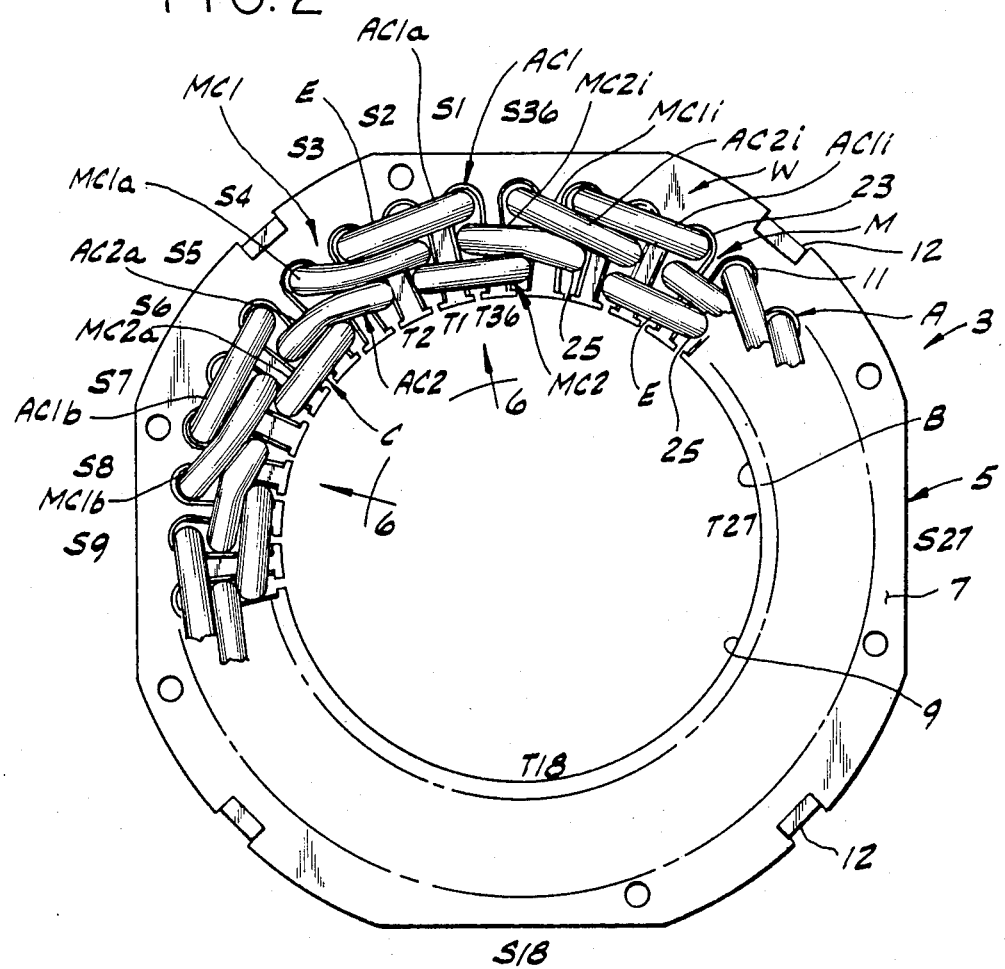
FIG. 2 is an end elevational view of a stator assembly of the present invention illustrating the lapped arrangement of concentric coils inserted in the stator slots of a core in accordance with the method of this invention.
Figure 3:
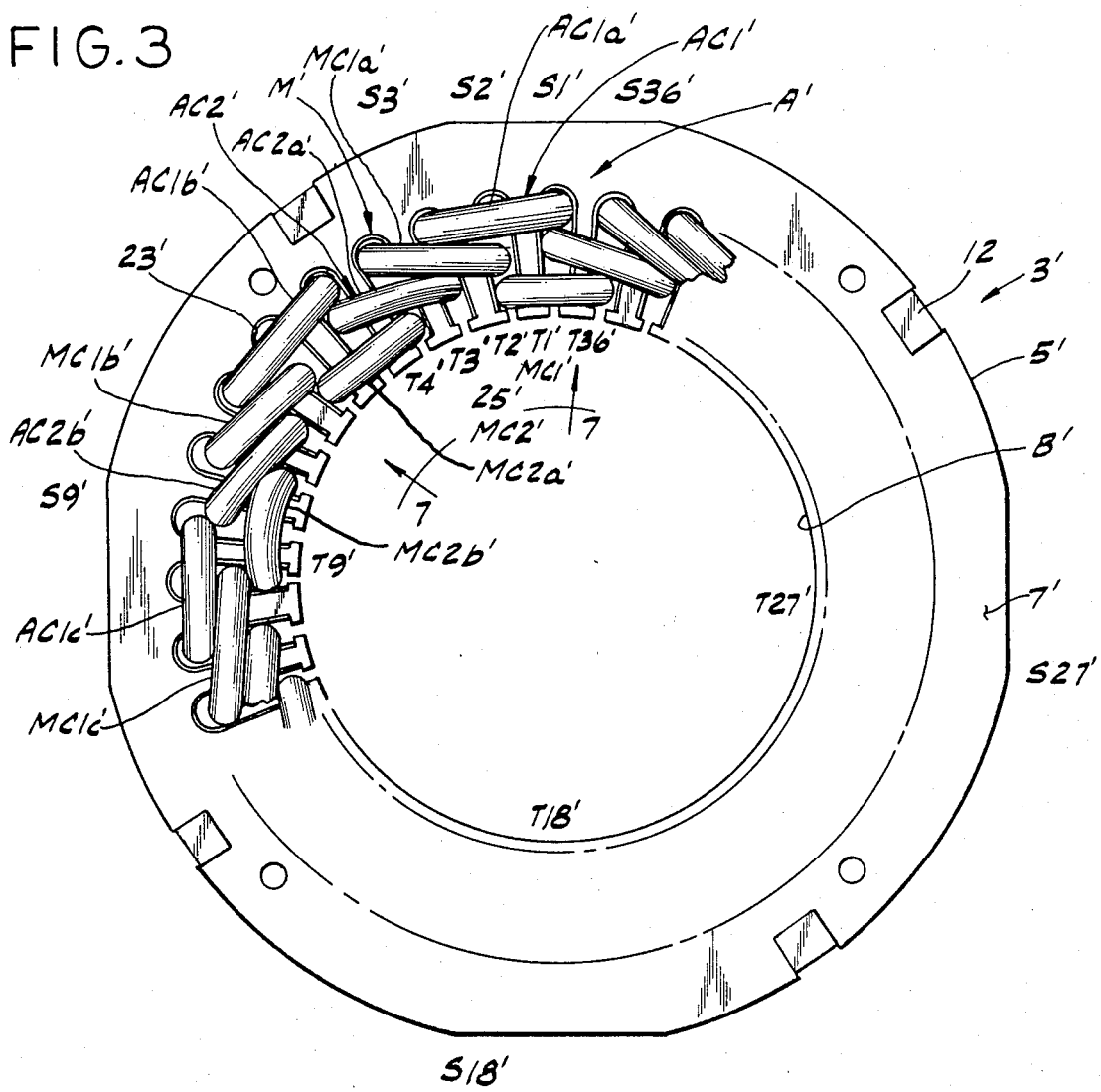
FIG. 3 is a view similar to FIG. 2 illustrating another embodiment of the present invention utilizing skein wound coils inserted in the slots of the stator core in an overlapping insertion pattern in accordance with the method of this invention.

Referring now to the drawings, and particularly to FIG. 1, a dynamoelectric machine is indicated in its entirety by reference character 1. Specifically, this dynamoelectric machine is shown to be a multiple-pole induction motor having a stator assembly 3 of the present invention. This stator assembly consists of a core 5 made from a stack of suitable ferromagnetic laminations 7. Each lamination has a central opening 9 therein (see FIG. 2) and a plurality of blind notches 11 extending radially outwardly from the central opening. As best shown in FIGS. 2 and 3, these notches are substantially equally angularly spaced around the lamination. When the laminations are stacked to form core 5 and when the central openings 9 of the stacked laminations are arranged coaxially with the radial notches 11 in register with one another, the central openings of the stacked laminations form a bore B extending longitudinally through the core and the notches form slots S extending longitudinally through the core. The laminations are held in stacked, assembled position by means of cleats 12 or by other means well-known to those skilled in the art. As shown in FIGS. 2–5, core 5 is provided with 36 slots spaced at 10° intervals around the core. These slots are numbered S1–S36, consecutively. Additionally, the portions of the stator core between adjacent slots form stator teeth, these stator teeth being consecutively identified T1–T36.

Still referring to FIG. 1, motor 1 further includes a rotor assembly, as generally indicated at 13, comprising a rotor body 15, and a rotor shaft 17 extending endwise from both ends of rotor body 15. The motor further includes a shell 18 and bearing supports or end shields 19a, 19b secured to the ends of the shell and carrying bearings 21a, 21b which receive and journal rotor shaft 17. As is conventional, an insulator 23 (see FIG. 2) of suitable electrically insulative material of a type well-known to those skilled in the art is inserted in each slot S1–S36 of the stator core thereby to electrically insulate the windings W of the motor inserted in slots S1–S36. Additionally, after the windings have been inserted in the stator slots, insulating wedges 25 may be inserted in the open throats of the slots so as to close off the slots and to further insulate the windings and to prevent individual turns of the winding from falling clear of the slots and possibly coming into contact with rotor body 15 received in bore B.

Figure 10:
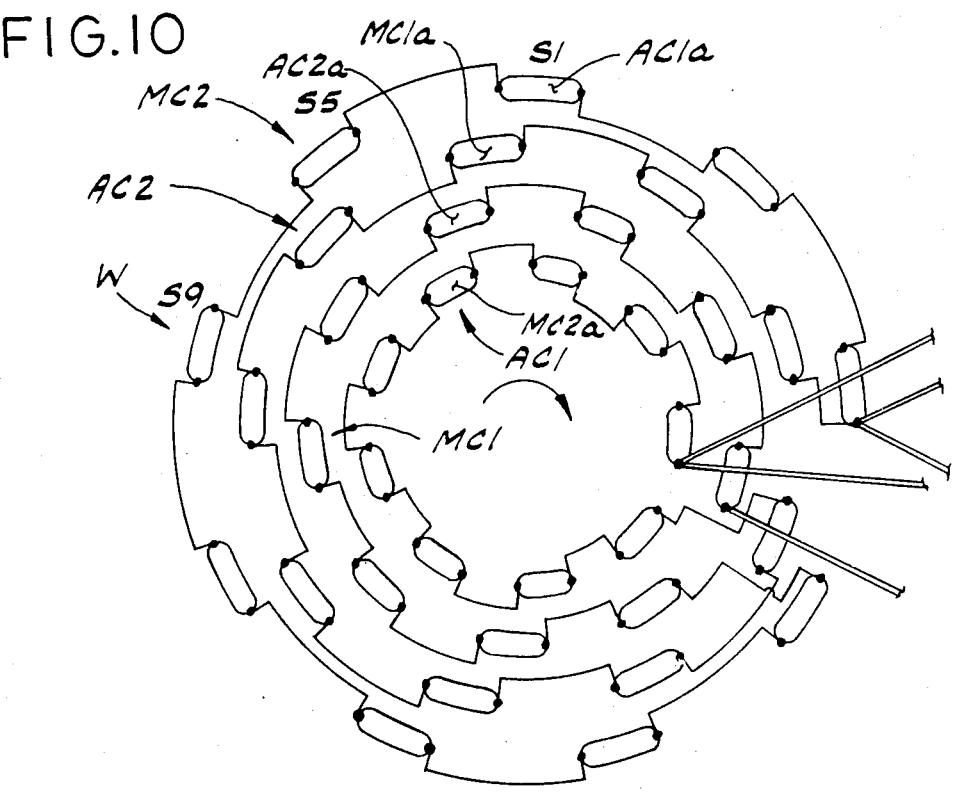
FIG. 10 is a semi-diagrammatic electrical connection diagram of the coil sets of the auxiliary and main winding coil sets of a motor in this invention, as shown in FIG. 2.
Figure 11:
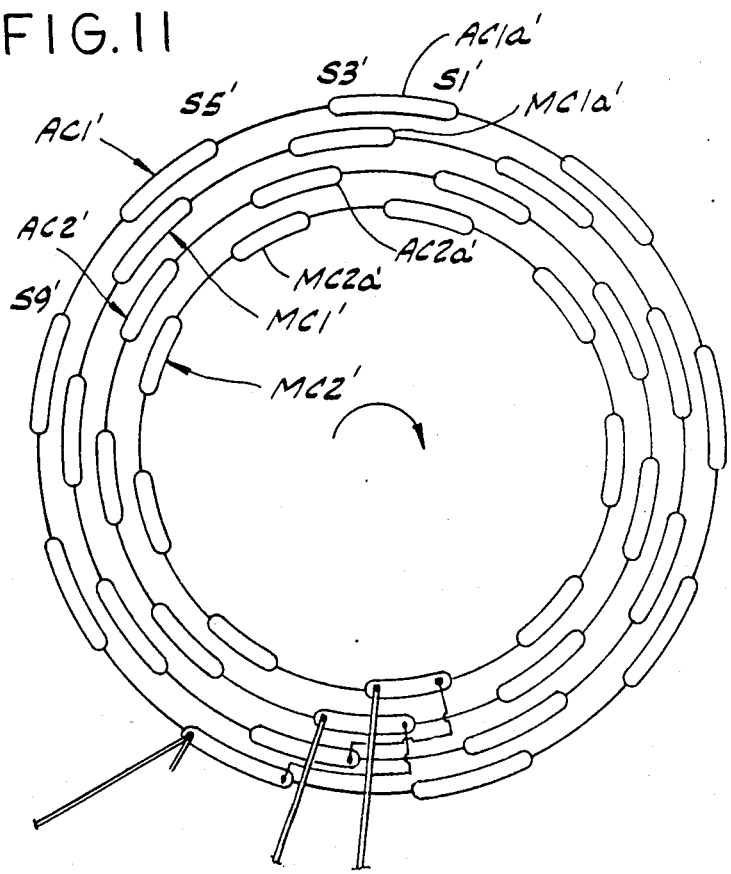
FIG. 11 is a view similar to FIG. 10 illustrating the electrical connection diagram of the stator assembly of the present invention, as shown in FIG. 3.

Specifically referring to stator assembly 3, as shown in FIG. 2, core 5 is shown to have a bore B of approximately 3.5 inches (8.9 cm.) an outer diameter of approximately 6.30 inches (16.0 cm.), and thirty six slots S1–S36 spaced around bore B. Windings W of stator assembly 3 are of a type referred to generally as concentric coil windings and they include an auxiliary winding A and a main winding M. Auxiliary winding A includes a first auxiliary winding coil set AC1 and a second auxiliary winding coil set AC2. Main winding M includes a first main winding coil set MC1 and a second main winding coil set MC2. Each of these coil sets includes nine coils C, each coil having a desired number of turns of magnet wire wound therein with each coil having a pair of opposed end turns (or apices) E (see FIG. 6) with straight coil sections or legs L extending between and connecting the end turns of the coil. The magnet wire constituting each of the coils C is wound concentrically on itself and the coils of each coil set are electrically connected together by the magnet wire in an electrical connection pattern, as is generally shown in FIG. 10.

In accordance with this invention, the first and second auxiliary winding coil sets AC1 and AC2 and the main winding coil sets MC1 and MC2 are inserted in slots S1–S36 of core 5 so that the coils of these coil sets are grouped together in layered fashion in core 5, generally as shown in FIGS. 2 and 3. One coil from each of the first and second auxiliary winding coil sets and from each of the first and second main winding coil sets, as indicated by the coils designated AC1a, MC1a, AC2a, MC2a, form this first layered group of coils. Specifically, coil AC1a is inserted in the slots of the stator core 5 so that its legs L are received in slots S1 and S3 of the core with its end turns E disposed out beyond the outer faces of the core. Coil MC1a is inserted in the slots of the core so that its legs are received in slots S2 and S4. The legs of the second auxiliary winding coil set coil AC2a are inserted in slots S3 and S5, and the legs of the last coil of the layered group, coil MC2a, are inserted in slots S4 and S6 whereby the entire layered group of coils extends over slots S1–S6 and spans teeth T1–T5.

A second layered group of coils, as indicated by coils AC1b, MC1b, AC2b and MC2b, is inserted in slots S5–S10 and spans teeth T5–T9. Specifically, the legs L of coil AC1b are inserted in slots S5 and S7, coil MC1b is inserted in slots S6 and S8, coil AC2b is inserted in slots S7 and S9, and coil MC2b is inserted in slots S8 and S10.

Further in accordance with the present invention, other layered groups of coils are likewise inserted in slots S1–S36 around bore B of core 5 in the same manner as described above for the first two groups. As illustrated, nine layered groups of coils, AC1a–MC1b through AC1i–MC1i are inserted in the core. It will be understood that the layered groups of coils overlap with one another. It will also be noted that, in accordance with this invention, only the auxiliary winding coils are inserted in certain of the slots and only the coils of the main windings are inserted in others of the slots.

Specifically, in regard to the first group of coils, it will be noted that only the auxiliary winding coils are inserted in slots S1, S3, S5, etc., while only the main winding coils are inserted in slots S2, S4, S6, etc. With the various coils of the auxiliary and main windings of stator 3 electrically connected together, as shown in FIG. 10, they form the windings W of a slow speed, multiple-pole, induction motor, such as may be particularly well suited for use as a ceiling fan motor.

Further in accordance with this invention, the method of the present invention generally involves the procedure of inserting the coils of the first and second auxiliary winding coil sets AC1 and AC2 and of the first and second main winding coil sets MC1 and MC2 in the slots S of core 5 generally in the manner described above in layered, overlapping groups, discussed above and as shown in FIG. 2. Specifically, the method of this invention of inserting the coils may be carried out by first inserting the coils of the first auxiliary winding coil set AC1 in their respective slots (e.g., in slots S1 and S3, S5 and S7, S9 and S11, etc.). Then, the coils of the first main winding coil set MC1 are inserted in their respective slots (e.g., in slots S2 and S4, S6 and S8, S10 and S12, etc.). Then, the coils of the second auxiliary winding coil set AC2 are inserted in their respective slots (e.g., in slots S3 and S5, S7 and S9, etc.). Finally, the coils of the second main winding coil set MC2 are inserted in their respective slots (e.g., in slots S4 and S6, S8 and S10, etc.).

Figure 4:
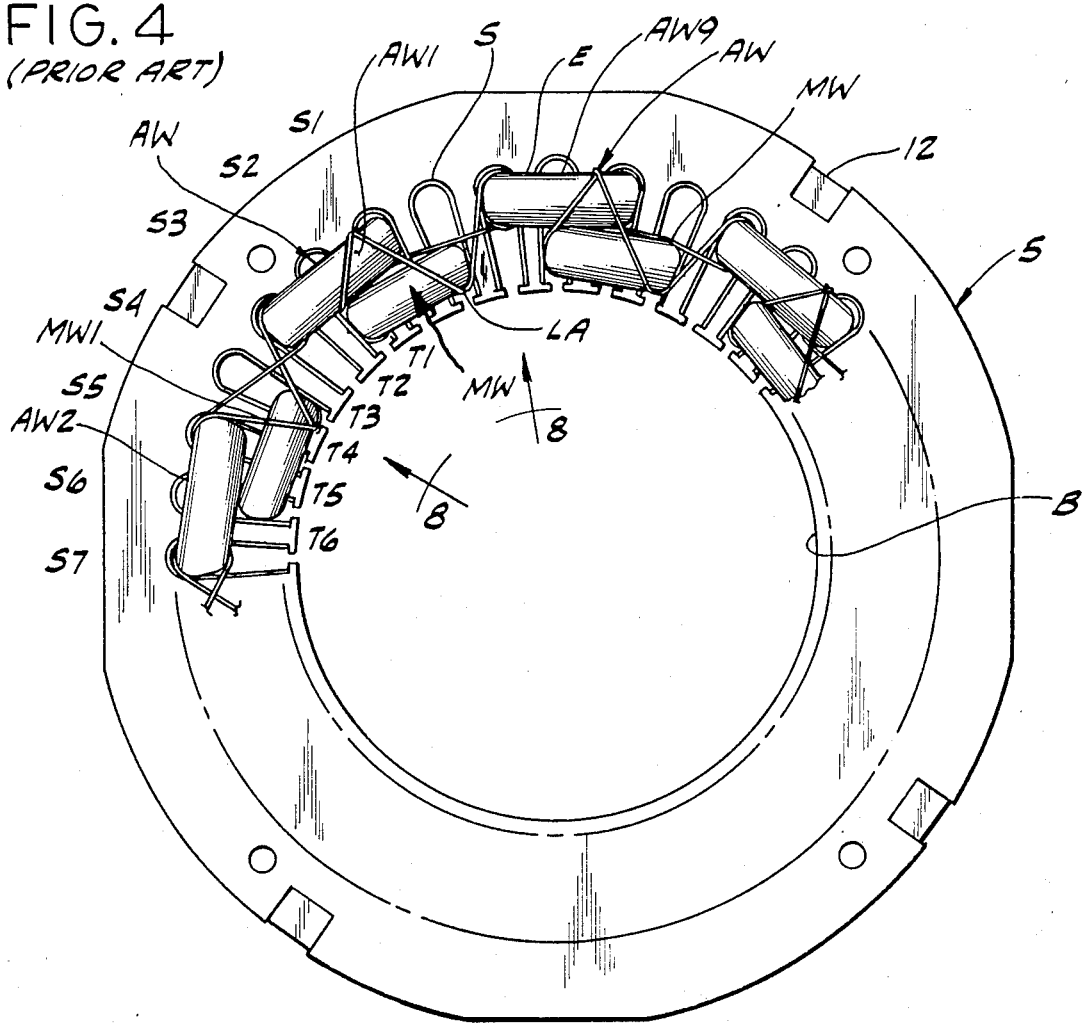
FIG. 4 is a view similar to FIG. 2 of a prior art concentric coil stator assembly.
Figure 8:
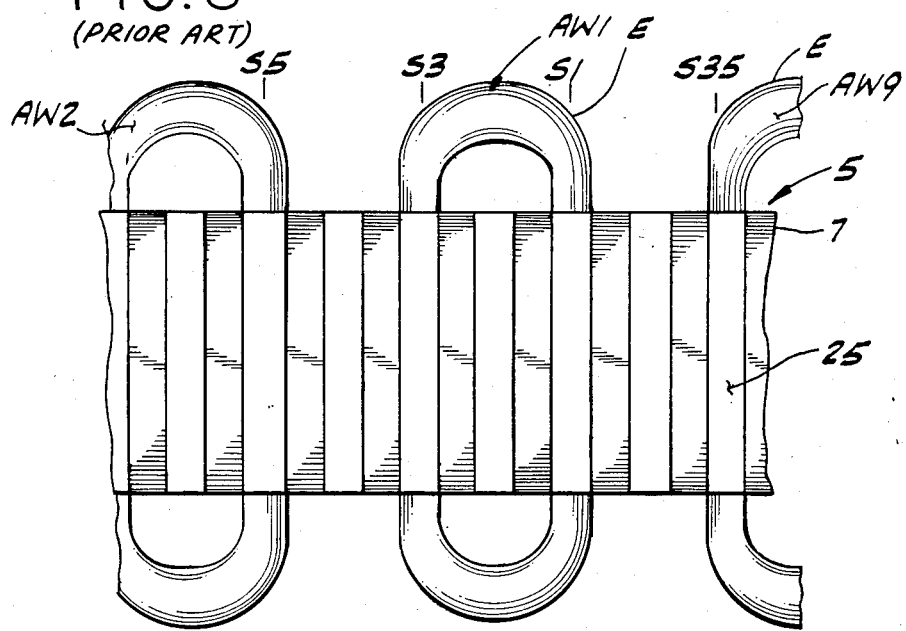
FIG. 8 is another view similar to FIG. 6, as described above, taken along line 8—8 of FIG. 4 illustrating in flat pattern a prior art concentric coil insertion pattern in a stator core.
Figure 5:
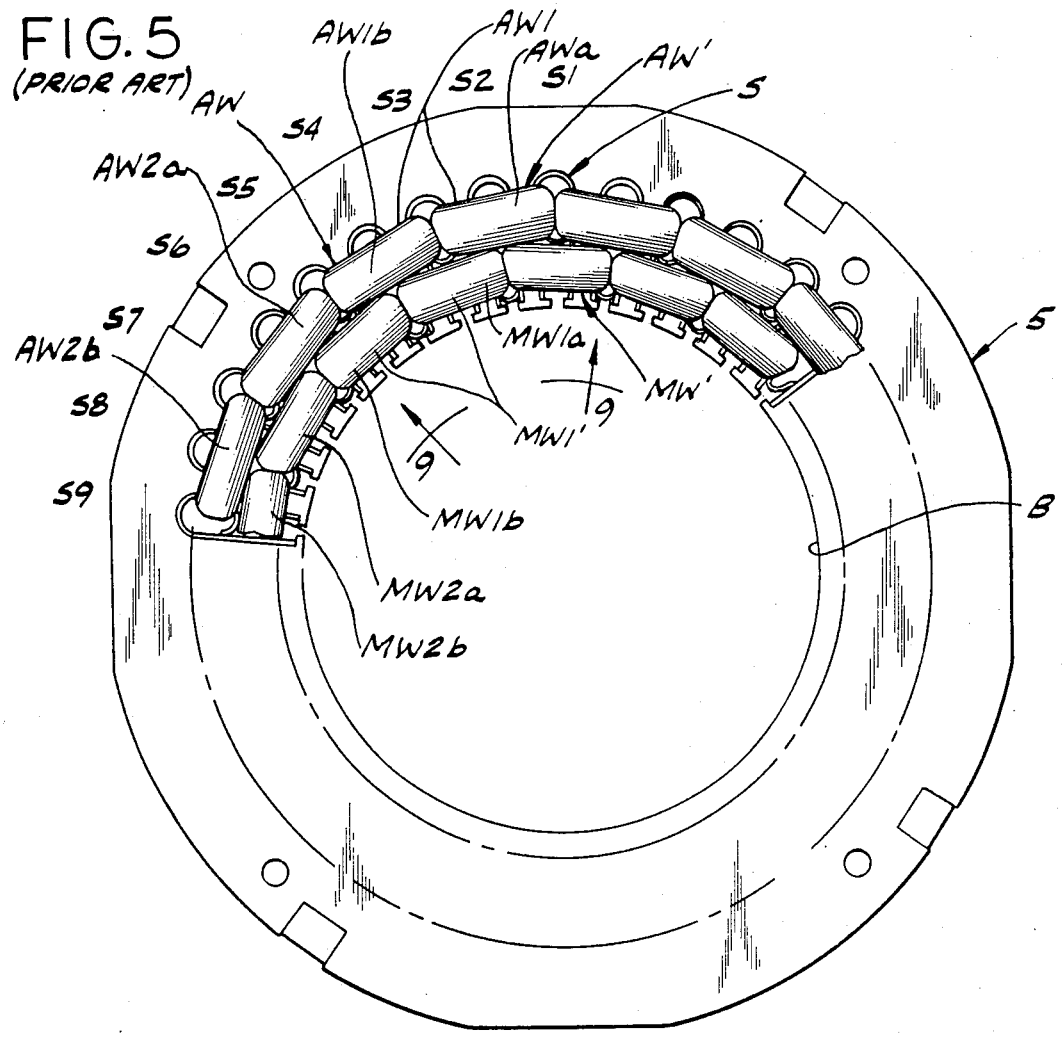
FIG. 5 is a view similar to FIG. 4 of another prior art stator assembly.
Figure 9:
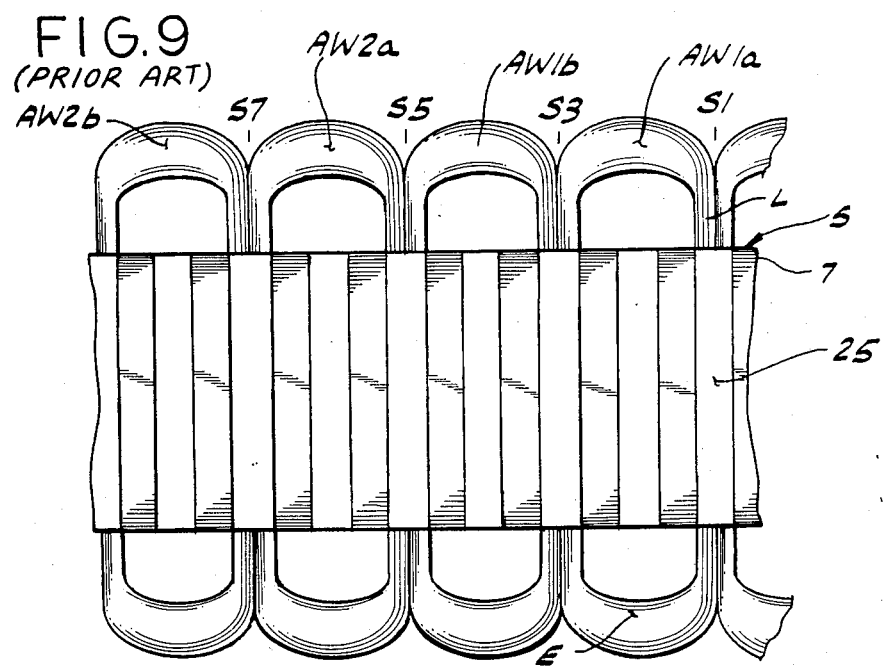
FIG. 9 is a view similar to FIG. 6, as described above, taken along line 9—9 of FIG. 5 illustrating in flat pattern another prior art concentric coil insertion pattern in a stator core.

It will be particularly noted that by dividing the auxiliary and main windings into two coil sets each, and by inserting the coils of the first and second coil sets of the auxiliary winding in the same slots, with the coils of the main winding coil sets being interleafed therebetween but not inserted in the same slots, only two relatively small coils need be inserted in the slots for the auxiliary winding or in the slots for the main winding thus permitting the apices or end turns of each of the coils to be bent to a relatively small radius (as shown in FIG. 6) and thus permitting the size of the end turns E of the windings W to be substantially reduced from similar prior art motors, such as is shown in FIGS. 4 and 5, which will be described in detail hereinafter. A stator assembly 3 made in accordance with this invention has substantially the same electrical operating characteristics as equivalent prior art concentric coil motor stator assemblies, such as shown in FIGS. 4 and 5, but yet, surprisingly, requires substantially less magnet wire. Additionally, because the end turns E of the windings W have been substantially reduced in the stator assembly 3 of the present invention, the requirement of having to lace the end turns so as to hold them against movement during operation of the motor has been eliminated thus again resulting in significant cost savings.

Referring now to another stator assembly of the present invention, which is generally indicated by reference character 3' in FIG. 3 and which is further illustrated in FIGS. 3 and 7, this other stator assembly of this invention will now be described in detail. In contrast to stator assembly 3 shown in FIG. 2 which was heretofore described as a concentric coil stator assembly, stator assembly 3' shown in FIG. 3 is a so-called skein wound stator assembly. However, this skein wound stator assembly 3' is similar to the stator assembly 3 described above in that the coils of the auxiliary and main winding coil sets are inserted in the stator slots S1'–S36' in layered, overlapping groups. In regard to the following description of stator assembly 3', it will be understood that parts of stator assembly 3' corresponding to parts of the stator assembly 3 described above have "primed" reference characters so as to indicate corresponding parts having similar functions. The auxiliary and main windings A' and M' of stator assembly 3' are also divided into first and second auxiliary winding coil sets AC1' and AC2', and into first and second main winding coil sets MC1' and MC2'. However, in contradistinction to the concentric coil windings described above in regard to stator assembly 3, the windings W' in stator assembly 3' are skein windings, generally as shown in FIG. 7.

Referring now to FIG. 14, a skein wound coil set (e.g., coil set AC1) for either the first or second auxiliary or main winding coil sets of stator assembly 3', as illustrated in FIG. 3, is shown in plan form after being formed on a skein coil former, such as is disclosed in the co-assigned and co-pending U.S. Pat. No. 4,357,968, issued to Vernon E. Kieffer, which is herein incorporated by reference. Specifically, each of the coil sets for the auxiliary and main windings constitute a single coil or skein of wire having a multiplicity of individual turns of wire which are formed to produce a petalled, serpentine coil form with a series of inwardly directing apices APi1–APi9 and a plurality of outwardly directed apices APo1–APo9 with generally straight coil sections or legs L, between the inner and outer apices E'. Thus, each coil C of the skein wound coil sets comprises one outer and one inner apices E' together with two straight coil sections L'.

Figure 7:
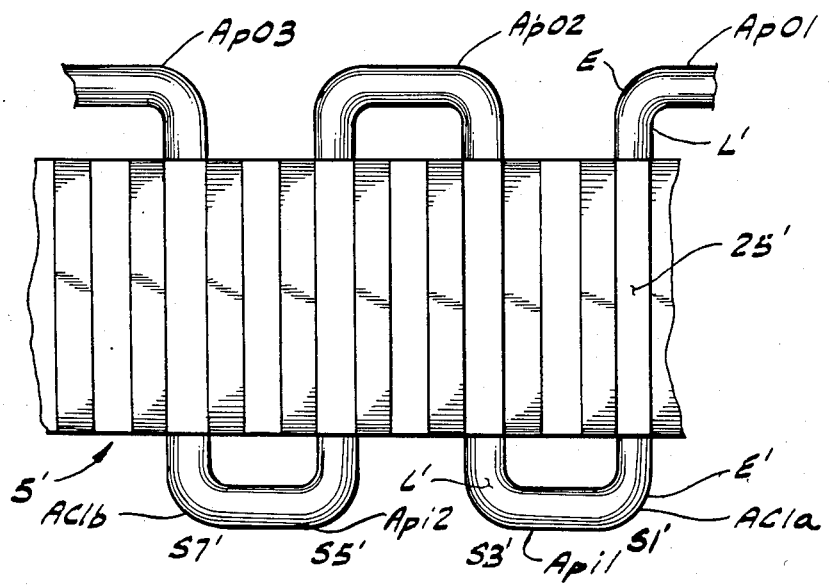
FIG. 7 is a view similar to FIG. 6 taken along line 7—7 of FIG. 3 illustrating in flat pattern the arrangement of one coil set (e.g, a first auxiliary winding coil set) of a skein wound coil set.

Referring now to FIGS. 3 and 7, the insertion of the auxiliary and main winding coil sets AC1', MC1', AC2' and MC2' in core 5' will now be described in detail. It will be understood, however, that a coil insertion method hereinafter described in which the four coil sets are described to be inserted one after the other is a possible insertion method, but that another method, hereinafter described, in which all four coil sets are simultaneously inserted in the core is preferred. However, the first-described method is useful in inserting coils where the slot fill is high. It will also be understood that the first method may also be used to insert coils C for stator 3 heretofore described.

Specifically, in regard to FIG. 3, the first method of inserting the coil sets in the core involves the insertion of the first auxiliary winding coil set AC1 in core 5'. It will be understood that all of the legs of the skein wound coil set AC1' may be inserted substantially simultaneously into the stator slots S' of core 5' by means of an axial coil inserter machine, as generally indicated at 201 in FIG. 16, such as generally known to those skilled in the art. As shown in FIG. 7, a leg L' of coil AC1a' is inserted in slot S1' with the inner apex APi1 disposed on one side of core 5' and with the outer apex APo1 disposed on the opposite side of the core. The next adjacent leg L' of the first auxiliary winding coil set AC1' is inserted in slot S3' with the outer apex APo2 disposed on the same outside face of core 5' as the other outer apex APo1. The remaining legs L' of the first auxiliary coil AC1' set are inserted in alternate core slots (e.g., S5', S7', S9' etc.).

Further in accordance with this invention, after insertion of the first auxiliary winding coil set, the first main winding coil set MC1' is inserted in the slots of core 5' in a manner similar to the first auxiliary winding coil set heretofore described. As shown in FIG. 3, the first leg L' of the first coil MC1a' is inserted in slot S2' and then the next other leg is inserted in alternate slots. The other coils constituting the first layered group of coils (i.e., coils AC2a' and MC2a') are respectively inserted in slots S3' and S5' and in slots S4' and S6'.

Still further in accordance with this invention, the second auxiliary winding coil set AC2' is inserted in the slots of the stator such that the legs of the second auxiliary winding coil set are received in slots S3', S5', . . . so that the odd numbered slots (e.g., slots S1', S3', S5' . . . ) each have one leg L' of each of the first and second auxiliary winding coil sets AC1' and AC2' inserted therein. Still further, the second main winding coil set MC2' is inserted in the even numbered slots starting at slot S4' so that each of the even numbered slots S4', S6', S8' . . . has one leg of each of the coil sets MC1' and MC2' of the main winding inserted therein. Thus, the coils of each of the main and auxiliary winding coil sets are grouped in layered sets or groups with each set or group including, for example, coils AC1a', MC1a', AC2a', and MC2a'. Once the main and auxiliary winding coil sets have been inserted in core 5, the individual coil sets and the coils therein are electrically interconnected with one another, as is shown in FIG. 14, so that the resulting stator assembly 3' may be utilized in a multiple-pole induction motor.

Stator assembly 3' results in even more compactness (and hence material and weight savings) than does stator assembly 3 heretofore described. This is realized in part because of the ease with which the skein wound main and auxiliary winding coil sets AC1', AC2' and MC1', MC2' may be inserted in core 5.

Main and auxiliary winding coil sets MC1, MC2 and AC1, AC2 of stator assembly 3 are preferably wound on conventional coil winding apparatus, such as is commercially available from Industra Products, Inc. of Fort Wayne, Indiana, or on a coil winding machine, such as shown in the co-assigned U.S. Pat. No. 3,714,973 to Kieffer et al which is herein incorporated by reference.

Further, a coil transfer tool, as indicated generally at 101 in FIG. 15, may be used to transfer the coils of one of the coil sets for either stator 3 or 3' from the coil winder to the blades of axial coil inserting machine 201. One such coil inserting machine as disclosed in U.S. Pat. No. 3,324,536 issued to D. E. Hill, June 13, 1967. Such coil inserting machines are also commercially available from Industra Products, Inc. A further example of a coil insertion device which may be used to insert the coil sets of the stator assemblies 3 or 3' in the cores 5 or 5' of the present invention is shown in the co-assigned U.S. Pat. No. 3,748,714 to Kieffer, which is herein incorporated by reference. A portion of the Kieffer coil inserting machine is shown in FIG. 16 to include wedge guide members 203 attached to a base 205 which in turn is supported on a platform or table 207. Further, a plurality of blades 209 and cooperative strippers (not shown) are provided. Selected blades are connected by plates (not shown) in such manner as to define slots between blades 209 for receiving the coils constituting the coil sets. Stator core 5 is positioned above blades 209 and an actuating mechanism is provided below table 207 for forceably moving the strippers so that with the coils of the coil set(s) placed on the blades, the strippers force the coils upwardly thereby to insert the coils in preselected slots S of the core. For a further description of the construction and operation of the coil inserting machine, reference may be made to U.S. Pat. No. 3,748,714.

As shown in FIG. 15, transfer tool 101 includes a base 103 and a plurality of elongate, cantilevered fingers F extending axially from the base, these fingers being spaced apart a distance sufficient to accommodate a leg L of a coil C therebetween. As shown in FIG. 15, tool 101 has eighteen fingers F1–F18 and the outer end of each of the fingers is so structured such that the placement of the coils on the tool and the insertion of the coils in the slots of core 3 or 3' is facilitated. Preferably, transfer tool 101 is of a suitable synthetic resin.

With a coil set, for example AC1, on transfer tool 101, as shown in FIG. 15, the transfer tool is installed on an axial coil inserting machine and the coil set is transferred from the transfer tool 101 to the inserting blades 209 of the inserting machine 201 in the manner described in the above-mentioned U.S. Pat. No. 3,714,973 to Keiffer.

After the first coil set or coil layer (e.g., the first auxiliary winding coil set AC1) has been inserted in core 3, as shown in FIG. 2, the next coil layer to be inserted (i.e., coil set MC1) is transferred from the coil winding machine to the axial inserting machine on its respective transfer tool 101 and is installed on the inserting blades of the inserting machine. However, upon inserting the second coil layer, the second coil set MC1 is indexed or rotated relative to stator core 3 and the inserting blades so that the first leg of the first coil MC1a of this second coil layer as now in position to be inserted in its respective slot S2 and so that the other legs of the other coils of this second coil layer are in register with their respective core slots S4, S6, S8, . . .

Further, upon inserting the third and fourth coil layers (i.e., coil winding sets AC2 and MC2), these other coil sets are indexed so that the first leg of the first coil AC2a of the third coil layer AC2 is inserted in slot S3 and so that the next adjacent legs of the third coil layer are inserted in slots S5, S7, S9, . . . , and so that the first coil leg of the first coil MC2a of the fourth coil layer MC2 is inserted in slot S4 and so that the remaining legs of the fourth coil layer are respectively inserted in slots S6, S8, S10, . . . In this manner, coil sets AC1, MC1, AC2, MC2 may be readily inserted in core 5 so as to form the above-described layered groups of coils.

Likewise, the skein wound coil sets AC1′, MC1′, AC2′ and MC2′ of stator 3′ of this invention may be readily inserted in core 5′. More specifically, the first coil set AC1′ carried by tool 101 is transferred to the inserting blades of an axial coil inserting machine. Core 5′ is then positioned above the inserting blades and the inserting machine is operated in the conventional manner so as to insert the first coil set AC1′ in its above-stated slots S1′, S3′, S5′, . . . , as shown in FIG. 3, thereby to form a first coil layer. Then the next coil set is indexed relative to the inserting blades as it is installed on the inserting blades from a respective transfer tool 101, and the inserting machine is actuated so as to effect the installation of the legs L′ of the second coil set MC1′ in slots S2′, S4′, S6′, . . . , thereby to form a second coil layer. Likewise, the third and fourth coil sets AC2′ and MC2′ are indexed on the blades and are inserted in their respective slots, as shown in FIG. 3, so as to respectively form third and fourth coil layers.

It will be understood that insulators 23 and wedges 25 are automatically formed and inserted in the slots by methods well-known to those skilled in the art.

Further in accordance with this invention, a second and preferred method of inserting coil sets AC1, MC1, AC2 and MC2 in core 5 will now be described. First, coil set AC1 is transferred on its respective transfer tool 101 to the inserting blades 209 of coil inserting machine 201 in a manner well-known to those skilled in the art so that the legs L of the first coil set are in position to be inserted in their intended slots (i.e., slots S1, S3, S5, . . . ) of core 5. Then, the next coil set MC1 is transferred on its respective transfer tool to the coil insertion machine and is installed on inserting blades 209 so that the legs of this second coil set are in position to be inserted in their intended slots (i.e., in slots S2, S4, S6, . . . ) of the core. It will be noted, however, that the coils of coil set AC1 and the coils of coil set MC1 are rotated or angularly offset relative to one another on blades 209 one slot (i.e., about 10°). Similarly, the third and fourth coil sets AC2 and MC2 are installed on the inserting blades so that the legs of coil set AC2 are in register with their intended slots S3, S5, S7, . . . and with slots S4, S6, S8, . . . , respectively.

With core 5 in position above the inserting blades 209, generally as shown in FIG. 16, and with all four coil sets installed on the blades as described above, the coil inserting machine is actuated and all four coil sets are substantially simultaneously inserted in their respective slots.

In regard to the stator assemblies 3 and 3′ of the present invention heretofore described and shown in FIGS. 2 and 3, the auxiliary coil winding sets were described to be the first windings to be in the stator. It will be understood, however, that this is but one preferred embodiment of the insertion pattern in accordance with the apparatus and method of the present invention. It will be further understood that instead of placing the auxiliary coil winding set first, one of the main winding coil sets may be first placed in the slots of the core. It should be noted, however, that both the method and apparatus of the present invention contemplate that the various coils of the coil sets be grouped together in layered groups similar in construction to those set out above.

Referring now to FIGS. 4 and 5, two prior art stator assemblies for multiple-pole induction motors suitable for use as ceiling fan motors are disclosed. These prior art motors will herein be described in detail so that their construction and operation may be compared with the stator assemblies 3 and 3′ of the present invention, as heretofore described.

Referring now to FIG. 4, a prior art, concentric coil stator assembly is shown. It will be understood that parts of the prior art stator coil assembly having a similar construction and operation as the corresponding parts of stator assemblies 3 and 3′ of the present invention heretofore described have corresponding reference characters and thus will not be described in detail. Specifically, the windings W of this prior art stator assembly, as shown in FIG. 4, comprise an auxiliary winding AW and a main winding MW which are each formed of a plurality of individual, concentric coils. Both the auxiliary and the main windings each include nine individual coils which are inserted into respective slots S of the stator assembly. As shown in FIG. 4, the first coil AW1 of the auxiliary winding AW is inserted in slots S1 and S3 so that it spans teeth T1 and T2. The next adjacent coil AW2 of the auxiliary winding is inserted in slots S5 and S7 so that it spans teeth T5 and T6. The remaining coils for the auxiliary windings are then inserted in their respective slots around stator core 5 with the legs of the auxiliary winding coils being received in slots S9, S11, S13 . . . , and with an even numbered slot S4, S8, S12 . . . between each of the auxiliary coils. The first main winding coil MW1 is inserted in slots S4 and S6 and the next main winding coil MW2 is inserted in slots S8 and S10. The remaining main winding coils are inserted in the even-numbered slots with one odd-numbered slot S3, S7, S11, . . . between each main winding coil. It will be noted that each stator slot has only one leg of one coil (i.e., either a leg of an auxiliary winding coil or a main winding coil) inserted therein. Each coil is, for example, comprised of a relatively large number of turns (e.g., 184 turns for the main coils and 330 for the auxiliary coils) of a specified wire thickness (e.g., #24 wire for the main coil and #27 wire for the auxiliary coil). Because these single coils for both the main and the auxiliary windings are relatively thick, they must have relatively large end turns E. Because these end turns are relatively large, the end turns of the windings must be laced together with suitable textile fiber lacing material LA thereby to physically hold the end turns against movement relative to one another and to hold the end turns in desired position during operation of the motor.

Figure 12:
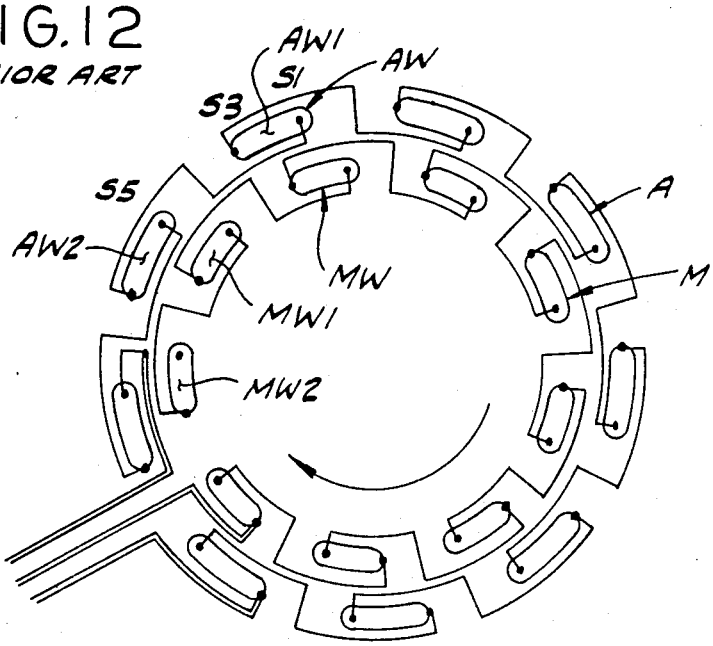
FIG. 12, is a view similar to FIGS. 10 and 11, but illustrating the electrical connection diagram of the prior art motor shown in FIG. 4.
Figure 13:
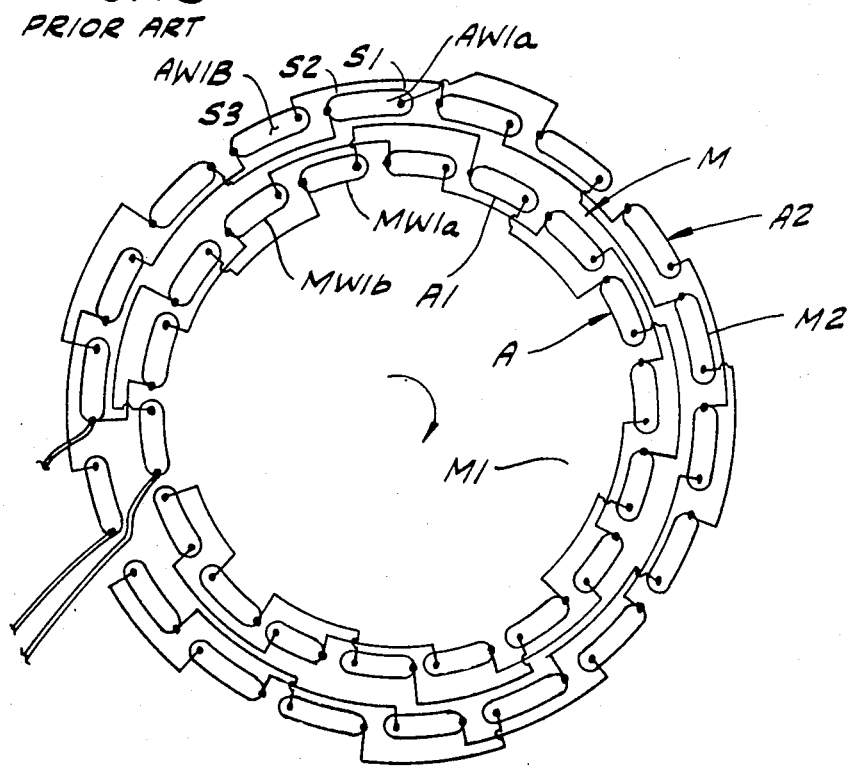
FIG. 13 is a view similar to FIGS. 10–12, but illustrating the connection diagram of a prior art concentric coil motor, as illustrated in FIG. 5.

The stator assembly shown in FIG. 4 is electrically connected so that the individual coils of both the auxiliary and main windings AW and MW are series connected to one another in the manner shown by the wiring diagram in FIG. 12.

Referring now to FIG. 5, another embodiment of a stator assembly for a multiple-pole induction motor is shown. Like the prior art stator assembly heretofore described and shown in FIG. 4, this prior art stator assembly comprises a main winding MW' and an auxiliary winding AW'. Here, however, each of the coils for the main winding and the auxiliary winding (i.e., coils MW1' and AW1') have been divided into respective pairs of coils MW1a, MW1b and AW1a, AW1b. Each main winding coil MW1a, MW1b may have 92 turns of #24 magnet wire therein, and each auxiliary coil AW1a, AW1b may have 165 turns of #27 magnet wire. As shown in FIG. 5, the first coil AW1a the first pair of coils AW1a, AW1b has its first leg L inserted in slot S1 and its other leg inserted in slot S3. The first leg of the second coil AW1b is also inserted in slot S3 and the other leg of the second coil is inserted in slot S5. Thus, the effective span of the first pair of auxiliary coils AW1a, AW1b of the stator assembly shown in FIG. 5 is from slot S1 to slot S5.

In a comparison of the stator assemblies shown in FIGS. 4 and 5, it will be seen that the effective span of the coils (i.e., coil AW1 in FIG. 4 and the pair of coils AW1a, AW1b in FIG. 5) of the auxiliary and main windings of the prior art stator assembly spans four teeth and the electrical characteristics of the motor are generally similar to one another. It will be noted that each of the coils of the windings of the stator assembly of FIG. 5 has half as many turns of wire than windings of the stator assembly of FIG. 4, and the end turns of the coils of the stator assembly of FIG. 5 may be formed to be on a tighter radius of curvature and thus the size of the end turns is appreciably decreased. For example, the amount of magnet wire required for the main and auxiliary windings of the stator assembly shown in FIG. 5 is approximately 5 per cent less than the amount of magnet wire required for the stator assembly shown in FIG. 4, with these two stator assemblies having essentially identical electrical characteristics. This does represent a reduction in cost. However, the prior art stator assembly shown in FIG. 5 nevertheless represents a considerable cost to manufacture and, because of the requirement of having to insert two legs of the coils in common slots, it is difficult to insert the coils in the slots and thus this winding pattern may not be used for certain motor designs.

EXAMPLE

Stator assemblies 3 and 3' made in accordance with the method and apparatus of the present invention, such as illustrated in FIG. 2 and 3, were constructed so as to have substantially identical electrical characteristics and were tested and the results compared. The cores 5 and 5' for stator assemblies 3 and 3' were constructed from 42 laminations of suitable ferromagnetic sheet-material having a thickness of 0.0295 inches (0.75 mm.). The bore B of the stator cores was 3.5 inches (8.9 cm.), and 36 slots S were provided. Each of the coils for the first and second auxiliary winding coil sets were wound with 165 turns of #28 wire, and each of the coils of the first and second main winding coil sets were wound with 92 turns of #24 wire. Stator assembly 3 shown in FIG. 2 had a wire weight of approximately 1.57 lbs. (0.71 kg.) and the wire weight of stator assembly 3' was essentially the same. When these stator assemblies were assembled in a motor in the manner generally shown in FIG. 1 with a suitable rotor assembly 13 installed in bore B, the motors produced 20.6 watts of power while consuming 110 watts of electrical power and while operating at a speed of 200 RPM.

As a comparison, two prior art stator assemblies generally as shown in FIGS. 4 and 5, were tested against the two stator assemblies 3 and 3' of the present invention. The prior art stator assembly generally shown in FIG. 4 consisted of a core made of 42 laminations of ferromagnetic sheet-material with each lamination having a thickness of 0.0295 inches (0.75 mm.) and having a bore B of 3.5 inches (8.9 cm.). The auxiliary winding of the stator assembly shown in FIG. 4 was comprised of nine coils of magnet wire with each coil having 330 turns of #27 wire therein, while the main winding consisted of nine individual coils of #24 magnet wire and having 184 turns. This prior art stator assembly had a wire weight of approximately 2.02 lbs. (0.91 kg.), and drew 112.5 watts of electrical power to produce 20.6 watts of work while operated at 200 R.P.M.

From a review of the stator assemblies 3 and 3' of the present invention as compared with the prior art stator assemblies, it can be seen that the wire weight of stator assembly 3 or 3' of the present invention is about 22% less than that of the prior art stator assembly shown in FIG. 4. Yet, surprisingly, the stator assemblies 3 and 3' of the present invention have somewhat improved electrical characteristics over the above-described prior art stator assemblies.

Because the stator assemblies 3 and 3' of the present invention use significantly less magnet wire than the stator assemblies heretofore utilized with prior art multiple-pole electric induction motors having similar electrical characteristics, it will be appreciated that the stator assemblies made in accordance with this invention represent a significant step forward in the motor art and result in appreciable cost savings in the manufacture of motors utilizing these stator assemblies.

While the stator assemblies and methods of the present invention have heretofore been described in conjunction with the fabrication of 18 pole induction motors intended for use as ceiling fan motors, those skilled in the art will appreciate that the stator assemblies and methods of the present invention may be utilized to construct other dynamoelectric machines for other applications having any number of desired poles.

In view of the above, it will be seen that the several objects and features of this invention are achieved and other advantageous results obtained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. The method of fabricating a stator for a multiple-pole dynamoelectric machine, said stator comprising a core assembled from a stack of laminations of suitable ferromagnetic sheet-material, said core having a central bore extending therethrough and a plurality of blind slots extending radially outwardly from said bore, said slots being substantially equally angularly spaced around said bore, said stator including a first winding and a second winding, said windings each comprising a plurality of coils of suitable magnet wire electrically connected to one another and inserted into said slots, each of said coils having a pair of end turns and a pair of generally straight coil sections extending between said end turns, wherein the method of this invention comprises the steps of:

A. forming said first winding by forming a skein of a suitable magnet wire of petalled, serpentine shape defining a plurality coils of a desired size, the number of coils being the same as the number of poles in said dynamoelectric machine, each of said coils being electrically connected in a desired pattern;

B. forming said second winding by forming a skein of a suitable magnet wire of petalled, serpentine shape defining a plurality of coils of a desired size, the number of coils being the same as the number of poles in said dynamoelectric machine, each of said coils of said auxiliary winding set being electrically connected in a desired pattern; and C. dividing said first and second windings into at least a first coil set and a second coil set;

D. inserting said coil sets of first and second windings in said slots of said core in the following manner so that the coils of said first and second windings are grouped together in layered fashion in said core by;
  i. inserting a first coil of the first coil set of said first winding in said core with said straigth coil sections of this last said first coil being received in a first and a third slot of said core,
  ii. inserting a first coil of said first coil set of said second winding in said core with said straight coil sections of said first coil of said first coil set of said second winding being received in a second and a fourth core slot,
  iii. inserting a first coil of said first coil set of said first winding in said stator core with said straight coil sections of said last said second coil being received in the third and in a fifth core slot,
  iv. inserting a first coil of said second coil set of said second winding in said stator core with the straight coil sections of this last said coil being received in the fourth and in a sixth core slot, whereby the first and second coils of said first and second coil sets of said first and second windings constitute a first layered grouping of coils in a first group of slots of said core, and
  v. repeating steps (D) (i) through (D) (iv) to form a second layered group of coils in a second group of slots of said core, and repeating said steps (D) (i) through (D) (iv) until all of said coils are inserted in said core.

2. The method of fabricating a stator assembly for a multiple-pole dynamoelectric machine, said stator assembly comprising a core assembled from a stack of laminations of suitable ferromagnetic sheet-material, said core having a central bore extending therethrough and a plurality of blind slots extending radially outwardly from said bore, said slots being substantially equally angularly spaced around said bore, said stator comprising a first winding and a second winding, said first winding including first and second coil sets and said second winding including first and second coil sets, each of said coil sets having a plurality of coils of magnet wire inserted in selective slots of said core, wherein the method of this invention comprises of the steps:

A. forming said first winding coil set of said first winding from a skein of wound magnet wire having a predetermined number of turns of magnet wire therein so that said skein is a coil of petalled, serpentine shape with a series of inwardly and outwardly directing apices with generally straight coil sections extending between said inward and outward apices, said straight coil sections each being adapted to be received in a respective slot of said core and each of said apices being adapted so as to be disposed on the outside of said core and to constitute the end turns of said first coil set of said first winding;

B. forming said second coil set of said first winding from a skein of wound magnet wire having a predetermined number of turns of magnet wire therein so that said skein is a coil of petalled, serpentine shape with a series of inwardly and outwardly directing apices with generally stragiht coil sections extending between said inward and outward apices, said straight coil sections each being adapted to be received in a respective slot of said core and each of said apices being adapted ao as to be disposed on the outside of said core and to constitute the end turns of said second coil set of said first winding;

C. forming said first coil set of said second winding from a skein of wound magnet wire having a predetermined number of turns of magnet wire therein so that said skein is a coil of petalled, serpentine shape with a series of inwardly and outwardly directing apices with generally straight coil sections extending between said inward and outward apices, said straight coil sections each being adapted to be received in a respective slot of said core and each of said apices being adapted so as to be disposed on the outside of said core and to constitute the end turns of said first coil set of said second winding;

D. forming said second coil set of said second winding from a skein of wound magnet wire having a predetermined number of turns of magnet wire therein so that said skein is a coil of petalled, serpentine shape with a series of inwardly and outwardly directing apices with generally straight coil sections extending between said inward and outward apices, said straight coil sections each being adapted to be received in a respective slot of said core and each of said apices being adapted so as to be disposed on the outside of said core and to constitute the end turns of said second coil set of said second winding;

E. inserting said first coil set of said first winding in said core so that a first straight coil section of said first winding coil set of said first winding is received in a first slot of said core and so that the next adjacent straight coil section of said first coil set of said first winding is received in a third slot, this insertion pattern being repeated so that a straight coil section of said first coil set of said first winding is inserted in the first, third, fifth . . . and next to the last slots of said core around said bore;

F. inserting said first coil set of said second winding in said core so that a straight coil section of said first coil set of said second winding is received in a second slot of said core adjacent said first slot and so that the next adjacent straight coil section of said first coil set of said second winding is received in a fourth slot so that the straight coil sections of said first coil set of said second winding are received in said second, fourth, sixth . . . and last slots of said core;

G. inserting said second coil set of said first winding in said core so that the first straight coil section of said second coil set of said first winding is received in the third slot of said core and so that the next straight coil section of said second coil set of said frist winding is received in a fifth slot of said core so that the straight coil sections of the second coil set of said first winding are received in the third, fifth, seventh and first slots of said core; and H. inserting said second coil set of said second winding in said core so that the first straight coil section of said second coil set of said second winding is received in the fourth slot of said core and so that the next straight coil section is received in the sixth slot of said core so that the straight coil sections of said second coil set of said first winding are received in the fourth, sixth, eight . . . and second slot of said core.

3. The method of claim 2 in which all of said coil sets are inserted substantially simultaneously in their respective slots.

4. The method of fabricating a stator assembly for a multiple-pole dynamoelectric machine, said stator assembly comprising a core assembled from a stack of laminations of suitable ferromagnetic sheet-material, said core having a central bore extending therethrough and a plurality of blind slots extending radially outwardly from said bore, said slots being substantially equally angularly spaced around said bore, said stator assembly comprising a first winding and a second winding, said first winding being divided into a first and a second coil set and said second winding being divided into a first and a second coil set, wherein the method of this invention comprises of the steps;

A. forming a first coil set of said first winding from a skein of wound magnet wire having a predetermined number of turns of magnet wire therein so that said skein is a coil of petalled, serpentine shape with a series of inwardly and outwardly directing apices with generally straight coil sections extending between said inward and outward apices, said straight coil sections each being adapted to be received in a respective slot of said core and each of said apices being adapted so as to be disposed on the outside of said core and to constitute the end turns of said first coil set of said first winding electrically connected to one another;

B. forming a second coil set of said first winding from a skein of wound magnet wire having a predetermined number of turns of magnet wire therein so that said skein is a coil of petalled, serpentine shape with a series of inwardly and outwardly directing apices with generally straight coil sections extending between said inward and outward apices, said straight coil sections each being adapted to be received in a respective slot of said core and each of said apices being adapted so as to be disposed on the outside of said core and to constitute the end turns of said first coil set of said first winding electrically connected to one another;

C. forming a third coil set of said first winding from a skein of wound magnet wire having a predetermined number of turns of magnet wire therein so that said skein is a coil of petalled, serpentine shape with a series of inwwardly and outwardly directing apices with generally straight coil sections extending between said inward and outward apices, said straight coil sections each being adapted to be received in a respective slot of said core and each of said apices being adapted so as to be disposed on the outside of said core and to constitute the end turns of said first coil set of said first winding electrically connected to one another;

D. forming a fourth coil set of said first winding from a skein of wound magnet wire having a predetermined number of turns of magnet wire therein so that said skein is a coil of petalled, serpentine shape with a series of inwardly and outwardly directing apices with generally straight coil sections extending between said inward and outward apices, said straight coil sections each being adapted to be received in a respective slot of said core and each of said apices being adapted so as to be disposed on the outside of said core and to constitute the end turns of said first coil set of said first winding electrically connected to one another;

E. inserting said first, second, third and fourth coil sets in six adjacent slots of said core so that certain of the straight coil sections of said first coil set are received in said first and third slots, so that certain of the straight coil sections of said second coil set are received in the second and fourth slots of said core, so that certain of the straight coil sections of said third coil set are received in the third and fifth slots, and so that certain of the straight coil sections of said one coil of said fourth coil set are received in the fourth and sixth slots thereby to form a layered groups of said first, second, third and fourth coil sets in slots 1–6; and F. repeating the steps of paragraph E so as to insert said first, second, third and fourth coil sets in slots 5–10, slots 9–14, etc., until all of said coil sets are inserted in said slots of said core in said layered groups.

5. The method of claim 4 in which all of said coil sets are inserted in their respective slots of said core substantially simultaneously.

6. The method of fabricating a stator assembly for a multiple-pole dynamoelectric machine, said stator assembly comprising a core assembled from a stack of laminations of suitable ferromagnetic sheet-material, said core having a central bore extending therethrough and a plurality of blind slots extending radially outwardly from said bore, said slots being substantially equally angularly spaced around said bore, said stator assembly comprising a first winding and a second winding, said first winding including a first and second coil set and said second winding including a first and a second coil set, wherein the method of this invention comprises of the steps;

A. forming a first coil set of said first winding from a skein of wound magnet wire having a predetermined number of turns of magnet wire therein so that said skein is a coil of petalled, serpentine shape with a series of inwardly and outwardly directing apices with generally straight coil sections extending between said inward and outward apices, said straight coil sections each being adapted to be received in a respective slot of said core and each of said apices being adapted so as to be disposed on the outside of said core and to constitute the end turn of said first coil set of said first winding electrically connected to one another;

B. forming a second coil set of said first winding from a skein of wound magnet wire having a predetermined number of turns of magnet wire therein so that said skein is a coil of petalled, serpentine shape with a series of inwardly and outwardly directing apices with generally straight coil sections extending between said inward and outward apices, said straight coil sections each being adapted to be received in a respective slot of said core and each of said apices being adapted so as to be disposed on the outside of said core and to constitute the end turns of said first coil set of said first winding electrically connected to one another;

C. forming a third coil set of said first winding from a skein of wound magnet wire having a predetermined number of turns of magnet wire therein so that said skein is a coil of petalled, serpentine shape with a series of inwardly and outwardly directing apices with generally straight coil sections extending between said inward and outward apices, said straight coil sections each being adapted to be received in a respective slot of said core and each of said apices being adapted so as to be disposed on the outside of said core and to constitute the end turns of said first coil set of said first winding electrically connected to one another;

D. forming a fourth coil set of said first winding from a skein of wound magnet wire having a predetermined number of turns of magnet wire therein so that said skein is a coil of petalled, serpentine shape with a series of inwardly and outwardly directing apices with generally straight coil sections extending between said inward and outward apices, said straight coil sections each being adapted to be received in a respective slot of said core and each of said apices being adapted so as to be disposed on the outside of said core and to constitute the end turn of said first coil set of said first winding electrically connected to one another, each of said coils of said first, second, third and fourth coil sets having a pair of spaced end turns and a pair of straight coil sections interconnecting the end turns;

E. placing said coil sets on the inserting means of an axial coil inserting apparatus with the coil sets being angularly offset relative to one another; and F. substantially simultaneously inserting said coil sets in respective slots of said core so that the straight coil sections of said first coil set of said first winding are received in the first and third slots, so that the straight coil sections of said first coil set of said second winding are received in the second and fourth slots of said core, so that the straight coil sections of said second coil set of said first winding are received in the third and fifth slots of said core, and so that the straight coil sections of said one coil of said second coil set of said second winding are received in the fourth and sixth slots thereby to form a layered group of the coils inserted in slots 1–6 and further so that the remaining coil sections of said coil sets are received in slots 5–10, slots 9–14, etc., with all of the coil sets being inserted in said slots of said core in layered groups.

7. The method of claim 6, further comprising the step of, after forming said coil sets, placing said coil sets on a transfer tool for storage of the coil sets and for transport to said coil inserting apparatus.

* * * * *